(12) United States Patent
Beck

(10) Patent No.: US 7,416,064 B2
(45) Date of Patent: Aug. 26, 2008

(54) BOOT FOR HYDRAULIC, HYDROPNEUMATIC OR PNEUMATIC PISTON-CYLINDER UNITS

(75) Inventor: Hubert Beck, Eitorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 11/181,605

(22) Filed: Jul. 14, 2005

(65) Prior Publication Data
US 2006/0012089 A1 Jan. 19, 2006

(30) Foreign Application Priority Data
Jul. 15, 2004 (DE) ........................ 10 2004 034 107

(51) Int. Cl.
*F16F 9/38* (2006.01)
(52) U.S. Cl. ................................. 188/322.12
(58) Field of Classification Search .............. 267/64.27, 267/64.23, 64.21, 64.24, 64.19; 188/322.12; 277/634
See application file for complete search history.

(56) References Cited

U.S. PATENT DOCUMENTS

| | | | |
|---|---|---|---|
| 3,602,387 A * | 8/1971 | Patnaude et al. ............. | 215/315 |
| 4,154,434 A * | 5/1979 | Wallis ......................... | 264/119 |
| 4,529,213 A * | 7/1985 | Goodman .................... | 277/636 |
| 4,629,641 A * | 12/1986 | Paullin ....................... | 428/36.9 |
| 4,969,542 A * | 11/1990 | Athmer et al. ......... | 188/322.12 |
| 5,015,002 A * | 5/1991 | Goodman et al. ............ | 277/636 |
| 5,126,712 A * | 6/1992 | Sugiyama .................... | 335/278 |
| 5,402,868 A * | 4/1995 | Handke et al. ......... | 188/322.12 |
| 5,472,072 A * | 12/1995 | Bumgarner ............ | 188/322.12 |
| 6,282,928 B1 * | 9/2001 | Fukumoto et al. .............. | 68/20 |
| 6,460,665 B1 * | 10/2002 | Gotz et al. ............. | 188/322.16 |
| 6,932,356 B2 * | 8/2005 | Gloaguen .................... | 277/636 |

FOREIGN PATENT DOCUMENTS

| | | |
|---|---|---|
| AT | 324 144 | 8/1975 |
| DE | 102 00 608 A1 | 8/2002 |
| GB | 1384012 A * | 2/1975 |

* cited by examiner

*Primary Examiner*—Robert A. Siconolfi
*Assistant Examiner*—Vu Q Nguyen
(74) *Attorney, Agent, or Firm*—Cohen Pontani Lieberman & Pavane LLP

(57) ABSTRACT

A boot for a hydraulic, hydropneumatic or pneumatic piston-cylinder unit, in particular for vibration dampers or spring struts for vehicles, covers a portion of a piston rod that projects from the cylinder of the piston-cylinder unit. To protect against dirt and/or damage, the boot is arranged between the end of the piston rod and the cylinder. The interior space of the boot undergoes a change in volume due to the relative movement of the piston rod and cylinder with respect to one another. At least one flow connection is provided which leads to the interior space of the boot and allows for air flow in and/or out of the interior space. The at least one flow connection is at least partly covered by an area of the boot.

13 Claims, 4 Drawing Sheets

BOOT FOR HYDRAULIC, HYDROPNEUMATIC OR PNEUMATIC PISTON-CYLINDER UNITS

BACKGROUND OF THE INVENTION

The present invention is directed to a bellows or boot for hydraulic, hydropneumatic or pneumatic piston-cylinder units, and particularly for vibration dampers or spring struts for vehicles, wherein the boot covers the portion of the piston rod that projects from the cylinder to protect against dirt and/or damage and is arranged between the end of the piston rod and the cylinder, the interior space of the boot undergoes a change in volume due to the relative movement of the parts with respect to one another, and at least one flow connection is provided which leads to the interior space of the boot and allows air to flow in and/or out.

Boots for piston-cylinder units in which a vibration damper or a spring strut is provided with a boot for protecting against dirt and/or damage are already known from German patent document DE 102 00 608 A1. Due to the relative movement between the piston rod and the cylinder, the interior space of the boot undergoes a change in volume, for which purpose an opening leading to the interior space of the boot is provided so that air can flow in and out. The air inlet and air outlet generate an air flow by which water or dirt particles that have penetrated via an outlet valve are conveyed back into the atmosphere.

Austrian patent document OE 324 144 further discloses a boot with openings for venting the interior space, the openings on the piston rod side are covered by a packing to protect against water and dirt particles. The packing is a component part of the boot and, if necessary, a ring-shaped filter adapted to the space can be introduced between the openings and the packing. This construction has the disadvantage that water and dirt particles, even in small amounts, can enter the interior of the boot and remain there owing to the lack of an outlet opening. As a result, the piston rod and the guide component are highly susceptible to corrosion, which can ultimately lead to failure of the piston-cylinder unit.

SUMMARY OF THE INVENTION

An object of the present invention is to provide a boot for hydraulic, hydropneumatic or pneumatic piston-cylinder units such that, while reducing assembly and providing an economical piston rod protection, the boot operates without the use of a filter and water or dirt particles that may possibly enter may be removed in a simple and safe manner.

The object is met according to the invention in that at least one flow connection is at least partly covered by an area of the boot.

The solution has the advantage that the boot is provided with additional areas which ensure a labyrinth-like protective seal so that it is difficult for water and dirt particles from the atmosphere to reach the piston rod area and in the event that small amounts of water or dirt reach the interior of the boot they are eliminated quickly and completely.

According to another feature of the present invention, at least one flow connection is constructed as a bore hole. The flow connection is constructed as a bore hole which is simple to produce, but a plurality of bore holes can also be arranged so as to be distributed along the circumference so that a desired cross section of the flow connection may be produced.

According to a feature of the present invention, at least one area is a component part of the boot. To form the at least one area as a component part of the boot, the at least one area is produced by a simple production method as an additional element of the boot and is produced together with the boot from the material of the boot. To facilitate manufacture, the at least one area is inverted and is only flipped over a first fold of the boot after the entire boot has been produced, so that the boot in its entirety can molded from the outside through a split mold and then inflated by compressed air from a die core, as is conventional.

In another embodiment, the boot and the area together form an open connection to the flow connection. This has the advantage that the area at least partially surrounds the boot coaxially.

Simple labyrinth-like sealing is achieved in that the open connection opens out in the area of a very small diameter of the boot.

In yet another embodiment, the boot has an area that covers the flow connection. This area may be formed as a nonreturn valve.

The labyrinth-like sealing system may be achieved using nubs to space the area from the boot, wherein the nubs are arranged so as to be distributed along the circumference.

To achieve a simple assembly and convenient storage, the areas and the boot are constructed in one piece.

Further, the inner side of the boot facing the piston rod may be provided with a nonreturn valve acting on the flow connection. The nonreturn valve is advantageously at least partially open in the unloaded state.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figures 1, 2:
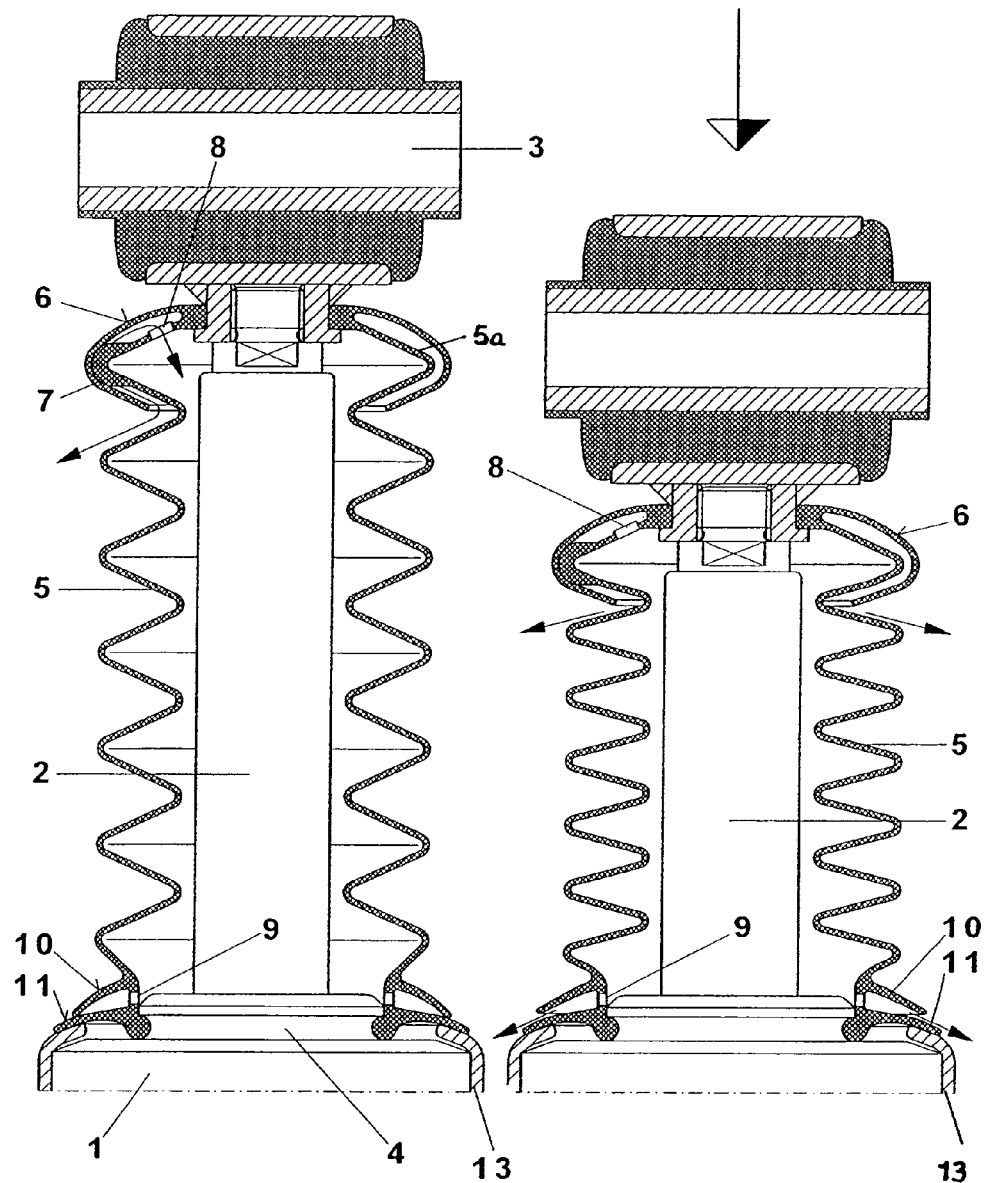
FIGS. 1 and 2 are sectional views showing a piston-cylinder unit together with a boot.

The piston-cylinder unit 1 in FIGS. 1 and 2 substantially comprises a container tube 13 in which individual parts (not shown in more detail) of a vibration damper are located. A piston rod 2 projects out of the container tube 13 and a fastening part 3 for fastening to a vehicle is located at the upper end of the piston rod 2. A piston rod guide 4 at the end of the container tube 13 guides the piston rod 2 so that the piston rod 2 is axially movable in the interior of the container tube 13.

Between the fastening part 3 and the piston rod guide 4, the boot 5 is tightly arranged at corresponding fastening points to protect the piston rod 2 from water, dust and stone debris. In the upper area of the boot 5, an area 6 comprises a first fold 5a of the boot 5 and is supported on a plurality of nubs 7 which are uniformly distributed around the circumference on the first fold 5a. It is difficult for dirt and water from the atmosphere to penetrate into the boot 5 at this location because the area 6 encloses a large portion of the first fold 5a and accordingly protects the flow connection 8.

On the opposite side of the boot 5, i.e., the lower area, additional flow connections 9 are provided at the bottommost point of the boot 5 and are covered outwardly by an area 10. The area 10 communicates with a collar 11 serving to cover the piston-cylinder unit 1. As the piston rod 2 moves in and out during a short stroke length, the air inside the boot 5 communicates with the atmosphere exclusively through the flow connection 8.

FIG. 2 shows the piston-cylinder unit 1 during a powerful inward movement of the piston rod 2 which produces a long stroke. In this case, a higher internal pressure occurs in the boot 5 in spite of the flow connection 8 being constantly open, so that a portion of the air inside the boot also passes through the flow connection 9 and reaches the outside between the collar 11 and area 10. This causes a cleaning and drying of the interior of the boot 5 in the unlikely event that water or dirt reaches the interior of the boot 5 past the area 6. The intensity of the self-cleaning of the interior of the boot 5 is influenced by the size of the effective cross section of flow connection 8, flow connection 9 and the construction of area 10. However, it is essential in this construction to minimize wear in area 10 and any noise which may possibly develop in area 10.

Figures 3, 4:
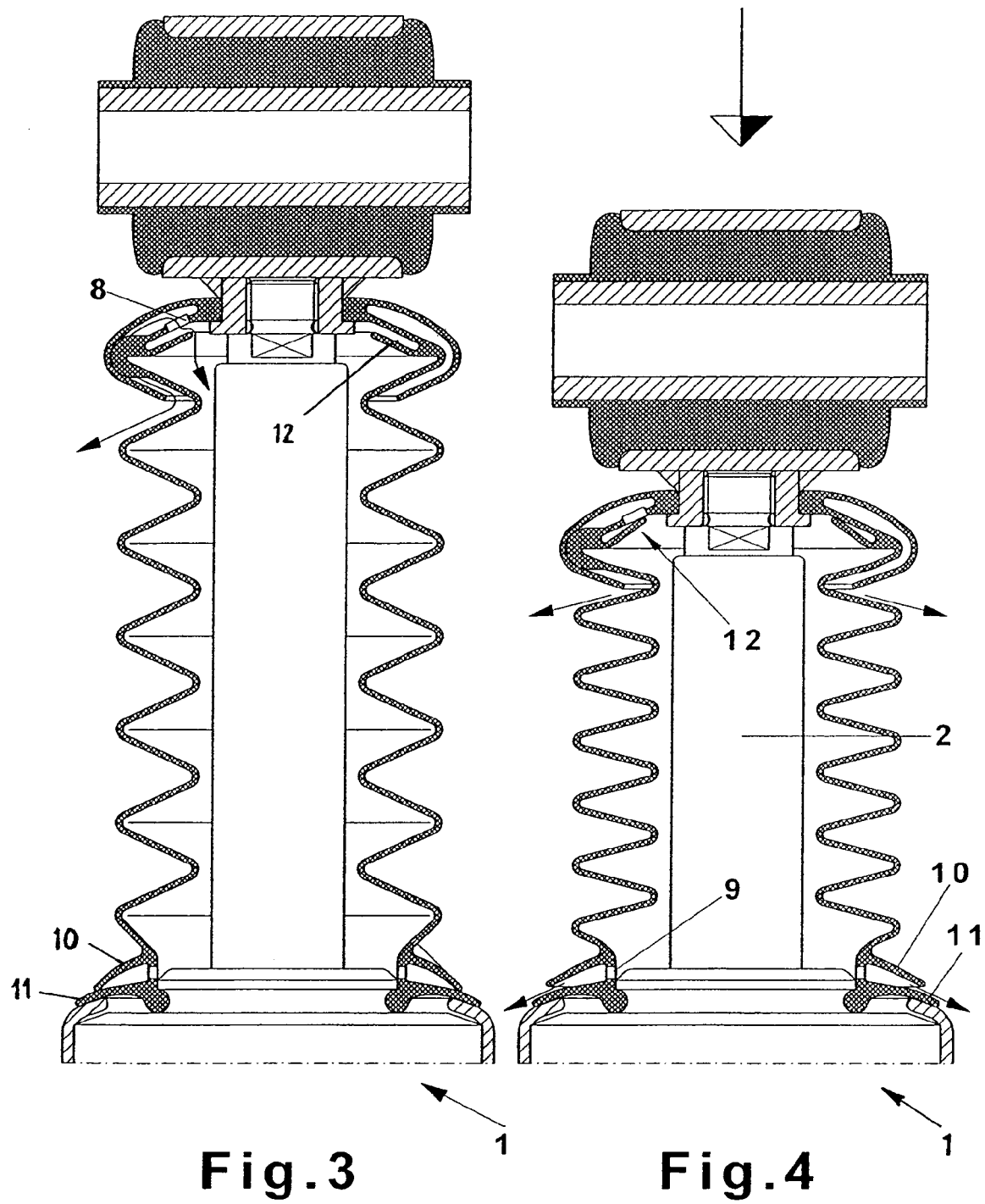
FIGS. 3 and 4 are sectional views of another embodiment of the boot of FIG. 1, but with an additional nonreturn valve in the area of the flow connection.

FIGS. 3 and 4 show another embodiment of a piston-cylinder unit 1 in which, in contrast to FIGS. 1 and 2, the flow connection 8 is provided with a nonreturn valve 12 on the inner side of the boot 5 which ensures that a large portion of the air in the interior space of the boot 5 can be moved outward into the atmosphere via the flow connection 9 and area 10 at high run-in speeds of the piston rod 2.

This behavior can be influenced by varying the tightness of the nonreturn valve 12. Area 10 can also be so constructed relative to the collar 11 that a constant opening is provided, which simultaneously prevents noise in the area of the flow connection 9.

In case of a constant opening in area 10, this area no longer acts as a nonreturn valve but merely as splash protection. Air flows into the interior of the boot 5 as the piston rod 2 moves out. This air flow into the interior can be kept small because the nonreturn valve 12 opens again at the same time that the piston rod moves out.

Figure 5:
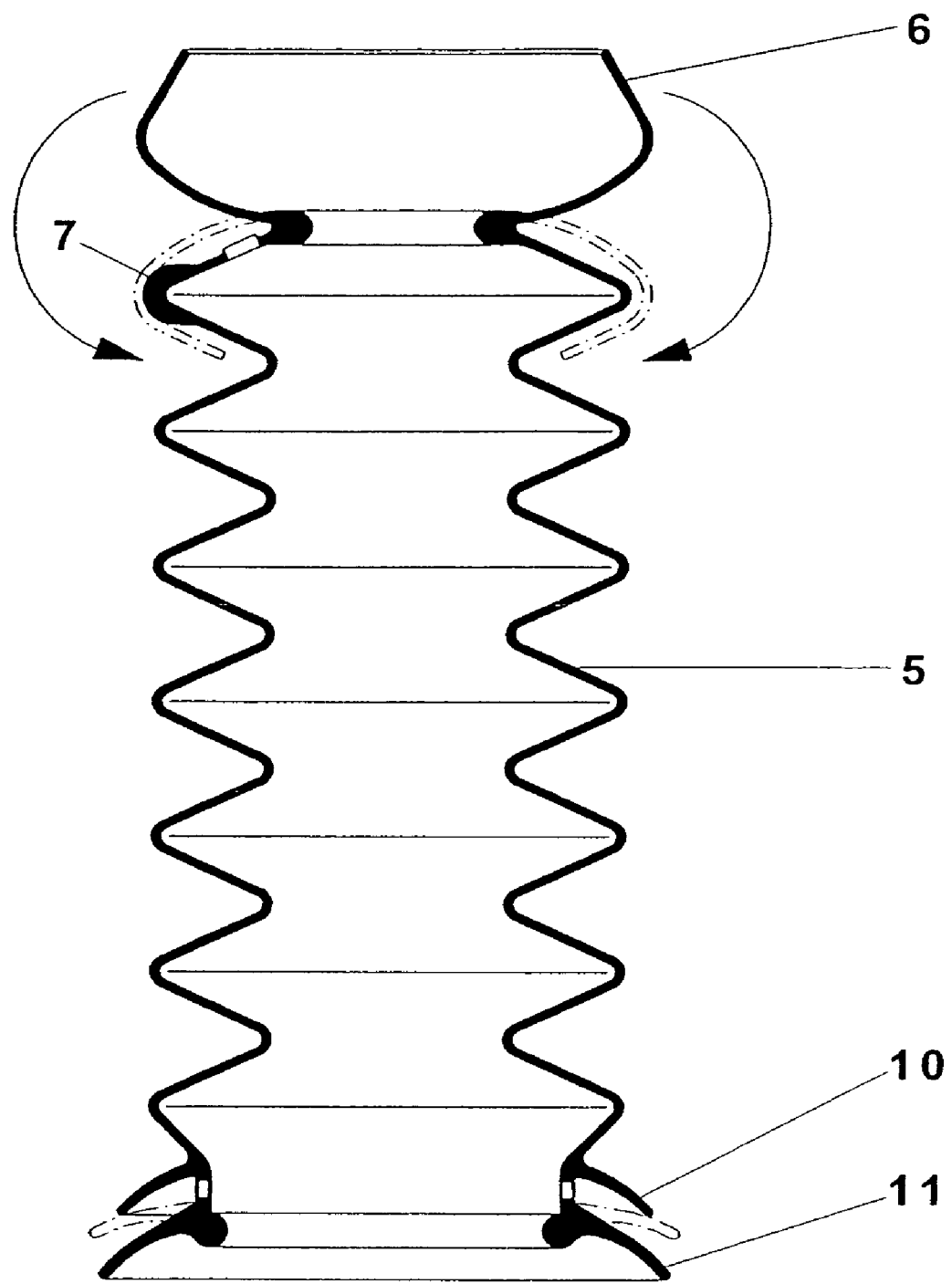
FIG. 5 is a sectional view of the boot of FIG. 1 as an individual part.

FIG. 5 shows a boot 5 as an individual part which is preferably made from rubber or a resilient rubber-like material. During the production of the boot 5, area 6 is initially turned up, as is shown in the top part of FIG. 5, and is folded down into the shape shown in dashed lines after production of the boot 5. The collar 11 is initially at a greater distance from area 10 and assumes the shape shown in dashed lines in the bottom part of FIG. 5 only after the boot 5 has been fitted to the piston-cylinder unit 1.

The use of a split mold ensures the shaping of the boot 5 so that the boot 5 can be molded from the outside and inflated from the core by means of compressed air as is conventional according to the current state of the art.

Figures 6, 7:
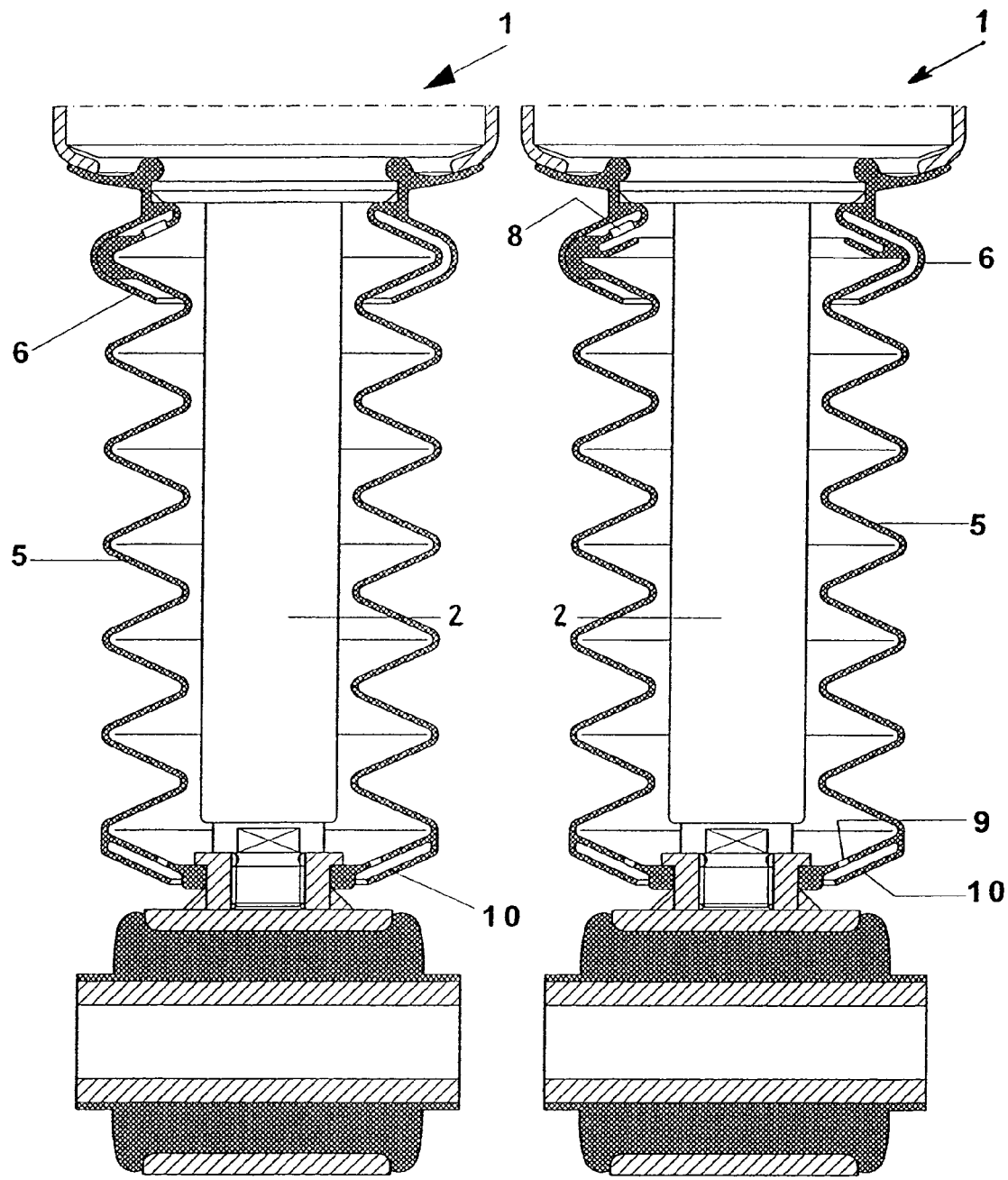
FIG. 6 is a sectional view showing another embodiment form of a piston-cylinder unit together with a boot.
FIG. 7 is a sectional view of yet another embodiment of the piston-cylinder unit with a boot.

FIGS. 6 and 7 show another variant of a boot 5 wherein the piston-cylinder unit 1 is installed with the piston rod 2 directed downward. Areas 6 and 10 again serve to protect flow connection 8 and flow connection 9.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A boot in a hydraulic, hydropneumatic or pneumatic piston-cylinder unit including a cylinder and a piston rod having an end projecting out of the cylinder, said boot covering the portion of the piston rod projecting from the cylinder and being arranged between the end of the piston rod and the cylinder for protecting against at least one of dirt and damage, said boot defining an interior space that changes in volume in response to relative movement of the piston rod and the cylinder, at least one flow connection being arranged in said boot allowing air in the interior space to communicate with the atmosphere external to said boot, and said boot further including a first flange comprising a collar arranged at an end of said boot serving to cover a portion of the piston-cylinder unit and a second flange arranged on said boot an axial distance from said collar, each of said first and second flanges having a radially inner end attached to said boot and a free radially outer end, the at least one flow connection being a bore hole through said boot disposed within the axial distance between the radial inner ends of said first and second flanges, said second flange forming a first nonreturn valve with said collar such that a flow of air through the at least one flow connection in a first direction is prevented by said first nonreturn valve.

2. The boot of claim 1, wherein said first and second flanges are constructed as a single piece with said boot.

3. The boot of claim 1, wherein said boot is arranged on a piston-cylinder unit comprising one of a vibration damper and a spring strut for vehicles.

4. The boot of claim 1, wherein said at least one flow connection comprises first and second flow connections on opposing ends of said boot, said first flow connection being arranged between the radially inner ends of said first and second flanges.

5. The boot of claim 4, further comprising a flap at least partially covering said second flow connection and nubs distributed along a circumference of said boot, wherein said flap is spaced from said boot by said nubs.

6. The boot of claim 5, wherein said flap and another portion of said boot define a connection to the second flow connection.

7. The boot of claim 6, wherein said flap at least partially surrounds said another portion of said boot coaxially.

8. The boot of claim 7, wherein the boot includes an area of large diameter and an area of small diameter, the connection opens in the area of small diameter of said boot.

9. The boot of claim 4, further comprising a second nonreturn valve arranged on an inner side of said boot and acting on said second flow connection.

10. The boot of claim 9, wherein said nonreturn valve is at least partially open in an unloaded state of the piston-cylinder unit.

11. The boot of claim 4, further comprising a second nonreturn valve arranged on an inner side of said boot and acting on said second flow connection, said second nonreturn valve is at least partially open in an unloaded state of the piston-cylinder unit, and closes during compression of the volume of said interior space when a pressure differential across the second nonreturn valve exceeds a first predetermined threshold such that air flows solely through said first flow connection during compression of said interior space.

12. The boot of claim 11, wherein said first nonreturn valve closes said first flow connection during expansion of the interior space when a pressure differential across said first nonreturn valve exceeds a second predetermined threshold.

13. The boot of claim 12, wherein said second flow connection is arranged proximate a top end of said boot and said first flow connection is arranged at a bottom end of said boot, whereby any dirt or water in said boot escapes though said first flow connection during compression of the volume of the interior space.

* * * * *